United States Patent
Hatamura et al.

(10) Patent No.: US 6,835,317 B2
(45) Date of Patent: Dec. 28, 2004

(54) METHOD OF MAKING SUBSTRATE WITH MICRO-PROTRUSIONS OR MICRO-CAVITIES

(75) Inventors: Yotaro Hatamura, 2-12-11 Kohinata, Bunkyo-ku, Tokyo (JP); Masayuki Nakao, Matsudo (JP)

(73) Assignees: Ebara Corporation, Tokyo (JP); Yotaro Hatamura, Tokyo (JP)

( * ) Notice: Subject to any disclaimer, the term of this patent is extended or adjusted under 35 U.S.C. 154(b) by 17 days.

(21) Appl. No.: 09/941,692

(22) Filed: Aug. 30, 2001

(65) Prior Publication Data

US 2002/0008078 A1 Jan. 24, 2002

Related U.S. Application Data

(63) Continuation of application No. 08/964,206, filed on Nov. 4, 1997.

(51) Int. Cl.[7] .............................................. G11B 5/127
(52) U.S. Cl. .......................... 216/11; 216/22; 216/42; 216/45; 216/63; 216/76; 216/79; 216/81
(58) Field of Search ............................ 216/11, 22, 42, 216/45, 63, 76, 79, 81, 64

(56) References Cited

U.S. PATENT DOCUMENTS

| | | | |
|---|---|---|---|
| 3,947,887 A | * | 3/1976 | Platter .......................... 360/221 |
| 4,407,695 A | | 10/1983 | Deckman et al. |
| 4,675,075 A | | 6/1987 | Sakai et al. |
| 5,221,841 A | | 6/1993 | Nagai et al. |
| 5,271,800 A | | 12/1993 | Koontz et al. |
| 5,303,100 A | * | 4/1994 | Nakayama et al. ...... 360/266.2 |
| 5,350,480 A | | 9/1994 | Gray |
| 5,353,182 A | | 10/1994 | Nakamura et al. |
| 5,411,630 A | | 5/1995 | Nagase et al. |
| 5,549,211 A | | 8/1996 | Nakamura et al. |
| 5,554,303 A | | 9/1996 | Kaneko et al. |
| 5,593,602 A | | 1/1997 | Gelder et al. |
| 5,597,495 A | | 1/1997 | Keil et al. |
| 5,677,011 A | * | 10/1997 | Hatakeyama et al. ....... 427/497 |
| 5,708,267 A | | 1/1998 | Hatakeyama |

(List continued on next page.)

FOREIGN PATENT DOCUMENTS

| | | | | |
|---|---|---|---|---|
| DE | 19518185 A1 | | 11/1996 | |
| JP | 08238426 A | * | 9/1996 | ............ B01J/19/08 |
| JP | 08257781 A | * | 10/1996 | ........... B23K/26/06 |
| JP | 08264511 A | * | 10/1996 | ....... H01L/21/3065 |
| JP | 09045639 A | * | 2/1997 | ......... H01L/21/302 |

OTHER PUBLICATIONS

Masahiro Hatakeyama et al., "Fast Atom Beam (FAB) Processing with Separated Masks", The Institute of Electronics, Information and Communication Engineers, vol. E78–C, No. 2, pp. 174–179 Feb. 1995.

Ichiki, K. et al, "New fast atom beam processing with separated masks for fabricating multiple microstructures" Thin Solid Films, 281–282, pp 630–633. 1996.

Toma, Y. et al "Fast atom beam etching of glass materials with contact and non–contact masks" Jpn. J. Appl. Phys., vol. 36, Part 1, No. 12B, pp 7655–7659. Dec. 1997.

Toma, Y. et al "Demonstration of Fast Atom Beam Etching of Glass Materials with Contact and Non–contact masks" Dig Pap Microprocess Nanotechnol, pp 148–149, 1997.

Primary Examiner—Allan Olsen
(74) Attorney, Agent, or Firm—Wenderoth, Lind & Ponack, L.L.P.

(57) ABSTRACT

A slider prevent the phenomenon of sticking and reduce entrapping of foreign particles between sliding surfaces. A method for making micro-protrusions or micro-cavities on a surface of a substrate comprises placing the substrate in a process chamber, supporting a mask member having a micro shielding surface independent of and in front of the substrate, and irradiating fast atomic beams onto the surface of the substrate through the mask member.

25 Claims, 21 Drawing Sheets

U.S. PATENT DOCUMENTS

| | | |
|---|---|---|
| 5,817,373 A | 10/1998 | Cathey et al. |
| 5,853,959 A | 12/1998 | Brand et al. |
| 5,868,952 A | 2/1999 | Hatakeyama et al. |
| 5,883,005 A | 3/1999 | Minton et al. |
| 5,895,582 A | 4/1999 | Wilson et al. |
| 6,010,831 A | 1/2000 | Hatakeyama et al. |

* cited by examiner

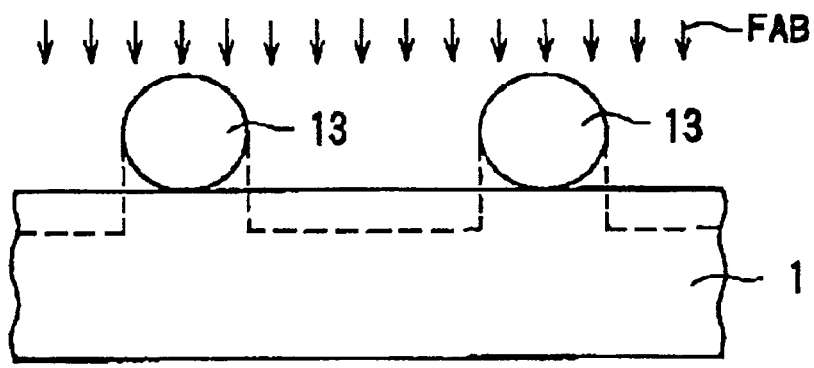
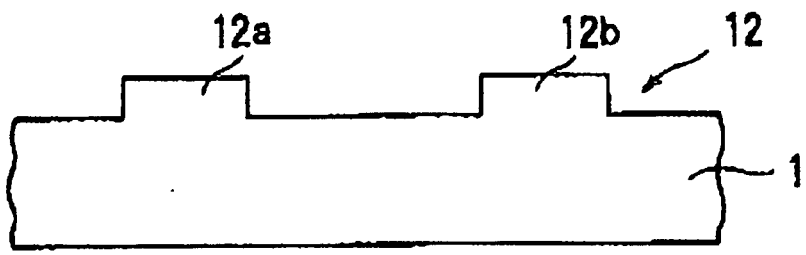
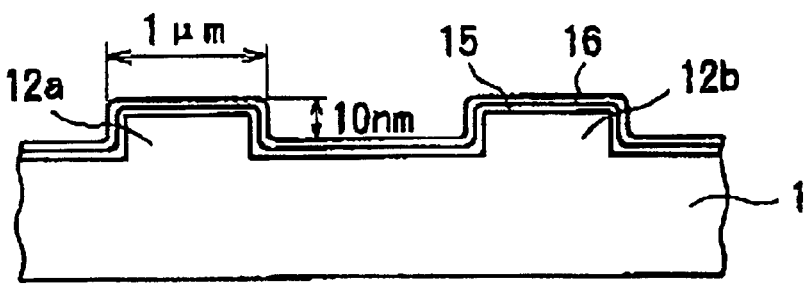

F I G. 7
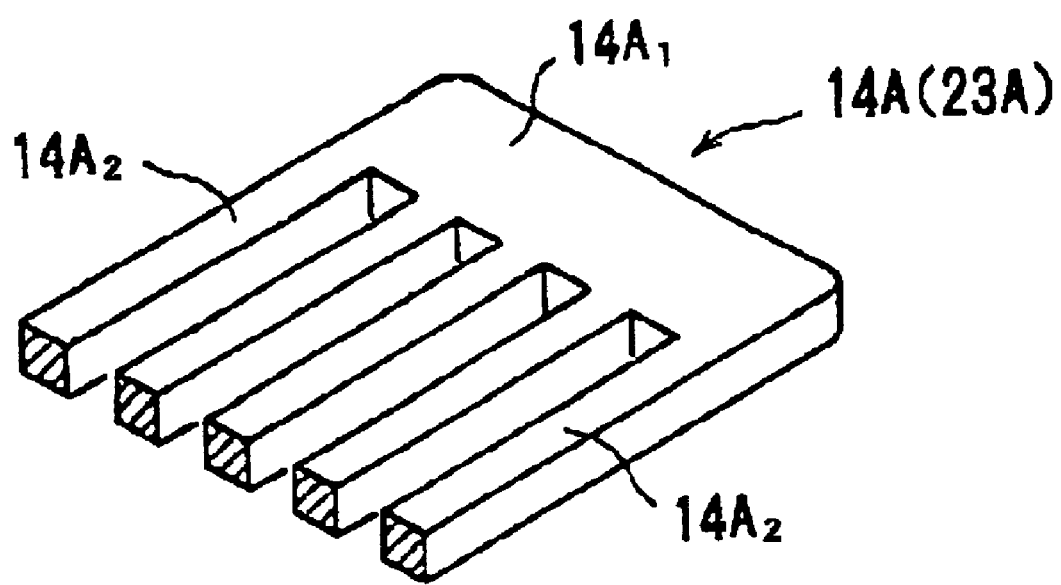

F I G. 1 0
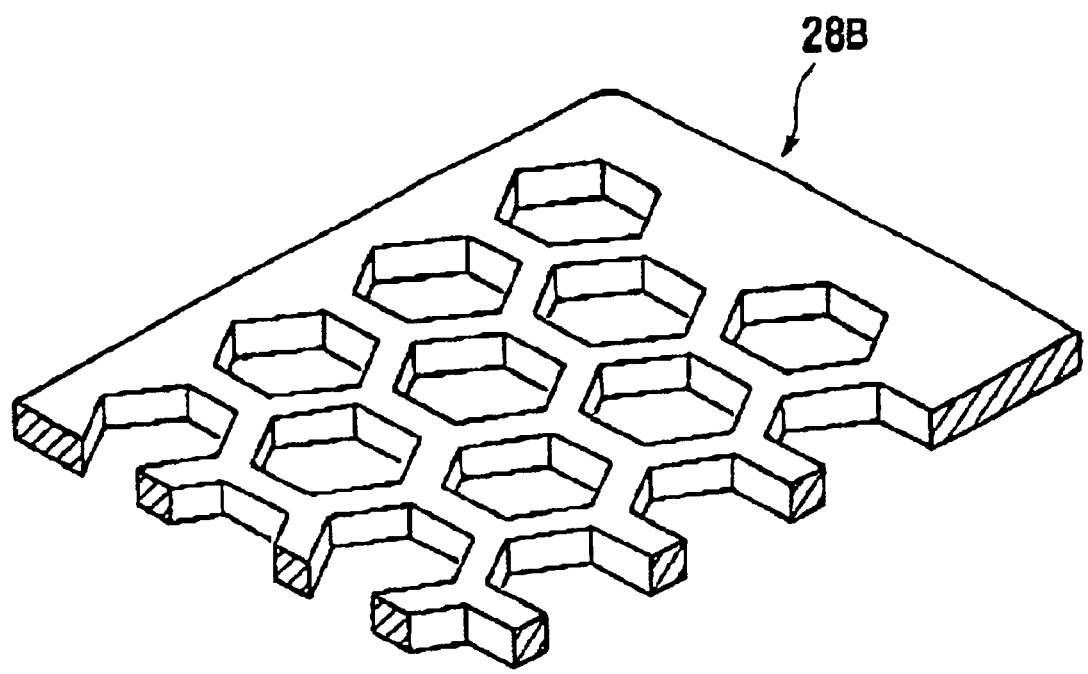
F I G. 1 1
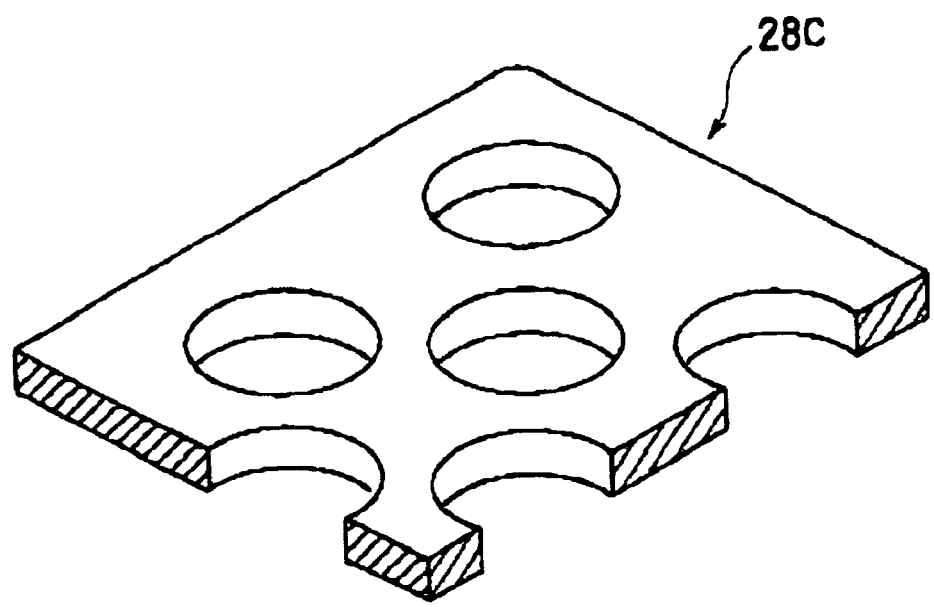

F I G. 1 2
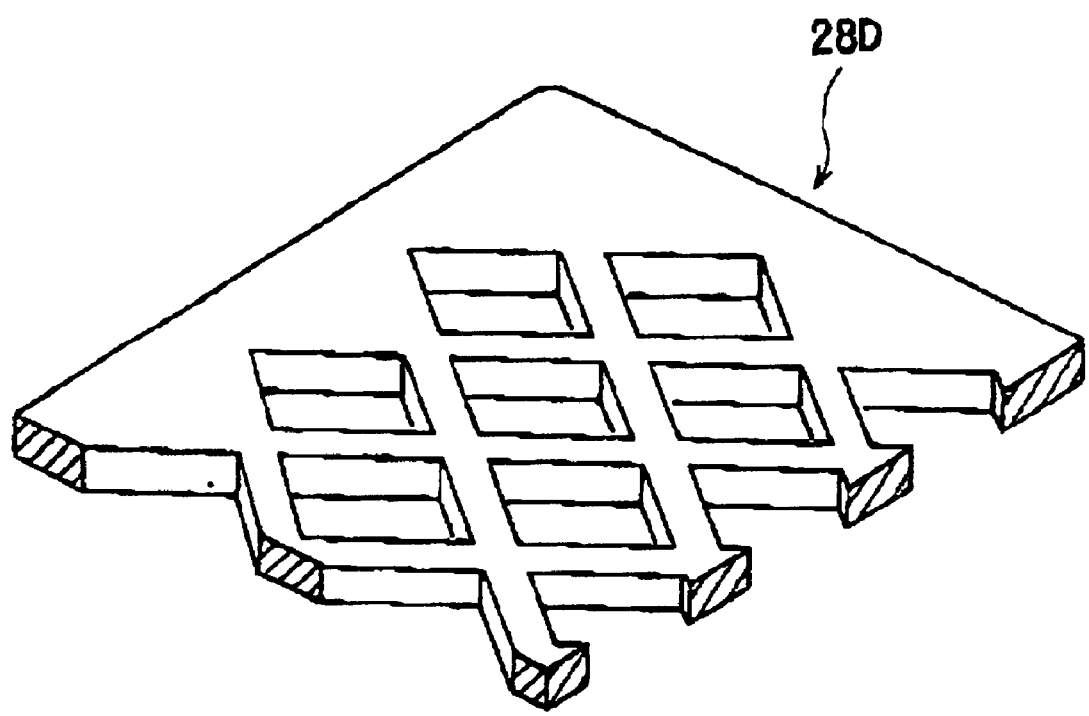

FIG. 14A
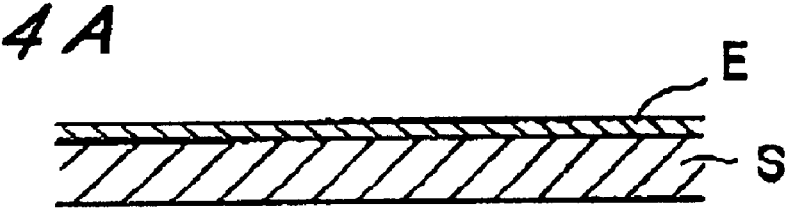
FIG. 14B
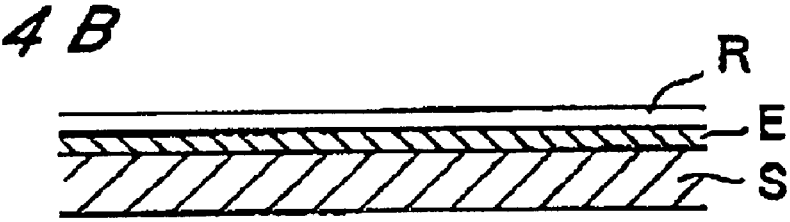
FIG. 14C
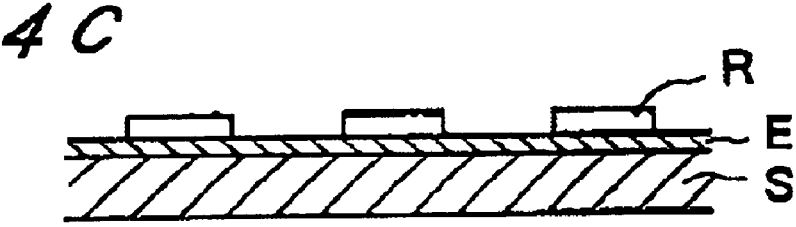
FIG. 14D
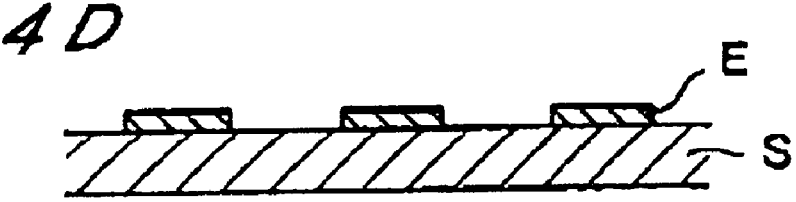
FIG. 14E
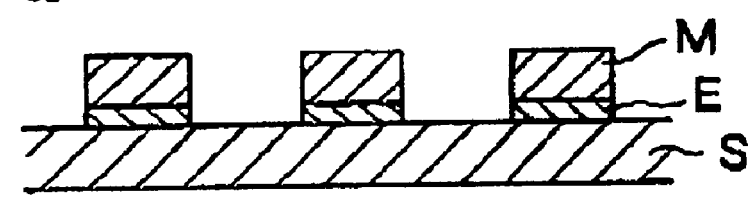
FIG. 14F
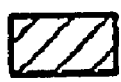

F I G. 20
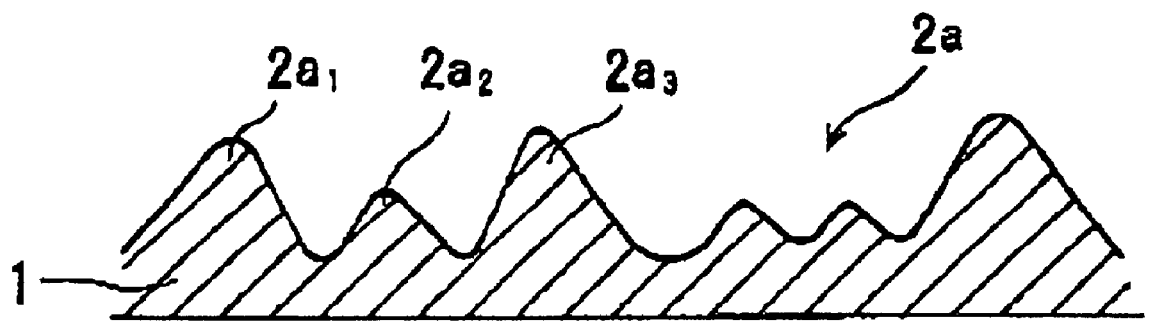

METHOD OF MAKING SUBSTRATE WITH MICRO-PROTRUSIONS OR MICRO-CAVITIES

This is a continuation application of Ser. No. 08/964,206 filed Nov. 4, 1997.

BACKGROUND OF THE INVENTION

1. Field of the Invention

The present invention relates to a slider member having micro-protrusions for reducing the sliding friction and a method of forming such micro-protrusions on the substrate surfaces, for example, between a magnetic disc and a slider of the magnetic head.

2. Description of the Related Art

Reading and writing on magnetic memories are performed by the relative sliding of a slider of a magnetic head sliding against a magnetic disc (hard disc). A dynamic pressure (wind pressure) is generated by the relative motion of the sliding surfaces, and forces the slider to separate from the disc surface; however, to obtain high strength signals, it is desired that the separation force be overcome and the distance between the slider and disc surfaces be minimized. In order to satisfy this condition even at low relative speeds without crashing the slider against the disc, the two surfaces may be made planar; however, when such two planar surfaces are brought close together, sticking (adherence) is generated because of the presence of moisture in the ambient air. Also, if a lubricant is used to reduce the friction, the phenomenon of sticking becomes even more aggravated. Sticking becomes more severe as the surface roughness (height of protrusions) diminishes, as the humidity increases and as the lubricant thickness increases. Therefore, to satisfy the above requirements in the presence of humidity and lubricant, the surfaces should be sufficiently smooth to minimize the distance between the slider and disc surfaces while sufficiently rough to prevent sticking. To meet such contradictory requirements, it has been a practice to provide micro-protrusions of the order of 10 nanometers (nm) on the sliding surfaces. This will be explained further with reference to FIG. 20.

FIG. 20 is a cross sectional view of micro-protrusions formed on a sliding surface by a conventional technique. In FIG. 20, the reference numeral 1 refers to a substrate of the magnetic disc made of an aluminum alloy, which may be covered with a nickel plating, or a glass substrate. The substrate 1 is first made into a plain surface $2a$, then the surface $2a$ is abraded lightly with abrading tape or cloth containing powder particles so as to produce a roughened surface containing micro-protrusions $2a_1$, $2a_2$, $2a_3$, of the order of 10 nm height. On top of the irregular shaped surface thus formed, a magnetic film layer and & protective film layer, made of a carbon film, $SiO_2$ film, ceramic film or other type of protective films, are deposited in succession to ultimately produce a sliding surface so that the contour of the outermost protective surface reproduces the irregular surface structure of the substrate.

FIG. 21 is a cross sectional view of micro-protrusions on a sliding surface produced by another conventional technique. In this figure, as in FIG. 20, the reference numeral 1 refers to a substrate of a magnetic disc. As in the previous case, the surface of the substrate 1 is made as a plain surface $2b$, and is then processed by such processes as sputtering and vapor deposition to form numerous protrusions $2b_1$, $2b_2$, and $2b_3$, on the top surface $2b$. This step is followed, as before, by deposition of a magnetic film layer and a protective film layer to ultimately produce a sliding surface having micro-protrusions. In this case, the top surface $2b$ may not necessary be a surface of the substrate, and may be a flat surface of a magnetic film or a protective film to which similar deposition techniques can be applied to ultimately produce a protective film layer having micro-protrusions $2b_1$, $2b_2$, and $2b_3$, to be used as the sliding surface.

FIG. 22 is a cross sectional view of micro-protrusions on a sliding surface made by yet another conventional technique. The reference numeral 1 refers again to a substrate of a magnetic disc as in the case shown in FIG. 20. As in the previous case, the surf ace is first made as a plain surface $2c$, then, depressions are produced by a dry etching or wet etching, thereby producing a top surface $2c$ having numerous protrusions $2c_1$, $2c_2$, and $2c_3$. This step is followed, as before, by deposition of a magnetic layer and a protective layer, to ultimately produce a protective top sliding layer having an irregular surface structure. In this case also, the top surface $2c$ may not necessary be a surface of the substrate, and may be a flat surface of a magnetic film or a protective film to which similar deposition techniques can be applied to ultimately produce a protective film layer having micro-protrusions $2c_1$, $2c_2$, and $2c_3$ to be used as the sliding surface.

There has been a serious problem in the actual use of the magnetic discs produced by the techniques described above. It has been found that, during the use of the magnetic disc in sliding contact with the slider of a magnetic head, foreign particles such as debris due to wearing as a result of the sliding action are entrapped between the slider and the disc, and are outstretched so as to stick to the slider or the disc thereby resulting in impeded transmission of signals. Furthermore, because moisture and lubricant may not be distributed uniformly across the surface of the disc, local sticking can occur between the slider and the disc, thereby causing abnormally high friction or, in some cases, self-vibration of the head (referred to as stick-slip), caused by sudden release from sticking, can result in plastic deformation or irregular friction phenomenon.

The debris biting and sticking phenomenon related to the conventional devices were examined in detail by the present inventors that led to the following observations. The primary causes are that, in the conventional devices, the inclusive angle of contact of the upright surface (side surface) of the micro-protrusions opposing the direction of relative movement of the sliding surface is small, which promotes the formation of a large meniscus. The formation of a meniscus on each of the various shaped of micro-protrusions will be explained in more detail with reference to FIGS. 23A, 23B and 23C which correspond to meniscus formation on micro-protrusions, $2a_1$, $2b_1$, and $2c_1$, having profiles show in FIGS. 20, 21 and 22, respectively. In FIGS. 23A–23C, the slider surface 3 (on a magnetic head for example) is in contact with a liquid substance 4 (moisture in air or lubricant) and the magnetic disc moves in the direction D relative to the slider surface 3- The meniscus means a curved boundary surface having a radius of curvature R formed between the air phase and the liquid phase. The relationship between the radius R and the profile shape of the micro-protrusions will be discussed further with reference to FIG. 24.

FIG. 24 is a cross sectional view of a micro-protrusion. As a representative profile of a micro-protrusion, the profile of the protrusion $2c$, shown in FIG. 23C has been chosen; however, this discussion applies in general to other profiles of micro-protrusions. The reference numerals are the same as those used earlier. A foreign debris particle 5 is present in the fore direction. In this example, the distance between the slider surface 3 and the bottom surface of the protrusion $2c_1$ is shown to be about 10 nm (the height of the micro-protrusion), and the profile is assumed to be symmetrical. The angle of the meniscus is θ which refers to the inclusive angle of contact between the slider surface 3 and the leading surface in the moving direction of the micro-protrusion $2c_1$. Force $F_1$ is exerted to the micro-protrusion $2c_1$, by the liquid substance 4.

If the inclusive angle θ is small, there is a larger area of contact between the slider surface 3 and the micro-protrusion $2c_1$, and the meniscus, i.e. a radius of curvature R, becomes large. The larger the meniscus, the larger the force $F_1$ to cause more sticking. Furthermore, it can be seen that if the inclusive angle θ is small, it is more likely that the debris particle can become lodged in the wedge shaped interface between the slider surface 3 and the micro-protrusion $2c_1$. It has therefore been concluded that debris biting and sticking phenomena are both related fundamentally to the inclusive angle of contact θ between the sliding surface and the micro-protrusion.

When the micro-protrusions produced by the conventional techniques shown in FIGS. 20–22 were examined, it became apparent that the inclusive angle θ is small (less than 70 degrees) and inevitably, large menisci are formed. In the conventional approach, the effort had been focused on the production aspects of micro-protrusions, and no attention has been paid to the shape of the micro-protrusions or the importance of the meniscus in causing operational problems.

SUMMARY OF THE INVENTION

It is an object of the present invention to resolve the problems inherent in the conventional techniques of producing micro-protrusions by emphasizing the importance of the structure of the micro-protrusions and a process of making optimum structures for micro-protrusions on the sliding surfaces. The approach is to prevent the phenomenon of sticking and reduce entrapping of foreign particles between the sliding surfaces.

This object has been achieved in a method for making micro-protrusions or micro-cavities on the surface of a substrate comprising the steps of: placing the substrate in a process chamber; supporting a mask member, having a micro shielding surface, independent of and in front of the substrate; and irradiating fast atomic beams onto the surface of the substrate through the mask member. Here, it is preferable that the micro-protrusions or micro-cavities have a height or depth ranging from 10 to 50 nm, and, for use in a slider member, 10 to 1,000,000 protrusions or cavities are formed on a 1 $mm_2$ surface of the substrate.

The mask member having a micro shielding surface has a very small area of projection for shielding the fast atom beams so as to form micro-sized unetched surfaces in a form of micro-protrusions. The mask member is constructed mechanically or physically independent of the substrate, and thus is separable from the substrate and is not integral with the substrate, as would be a photoresist layer coated on the substrate surface. The mask member is usually held in parallel to the substrate surface.

The substrate may be a slider member for use in a mechanically sliding portion, that is, at least one of the members relatively movable to the other in a sliding manner. The fast atomic beams are usually irradiated substantially at right angles onto the surface of the substrate.

The mask member may comprise micro-objects dispersed on the surface of the substrate, e.g. round shaped micro-powders, strings, rods, debris or in any shape. The micro-objects may comprise at least one material selected from the group comprising alumina, carbon, $Si_3N_4$, SiC, TiN, $ZrO_2$, MgO, and synthetic resin. Toner particles for use in copying machines are also usable.

The mask member may comprise a plurality of fine wire or rod members disposed in contact with or in proximity of the substrate surface, which are usually arranged in parallel or to form a matrix.

Another aspect of the invention is a method for making micro-protrusions or micro-cavities on a surface of a substrate comprising the steps of: dispersing micro-particles on the substrate surface; and irradiating the substrate surface with fast atomic beams at an angle of incidence determinable by an inclined angle measured with respect to a rotation axis normal to the substrate surface while a beam source relatively swivels about the rotation axis. The inclined angle with respect to the rotation axis is more than 0 degree and can be selected in a range from 0 to 90 degrees. Usually the beam source is driven to swivel about the rotation axis, however, the substrate can be driven to rotate about the beam axis to obtain the same effect.

Another aspect of the invention is a method for making micro-protrusions or micro-cavities on a surface of a substrate comprising the steps of dispersing micro-particles susceptible to etching by fast atomic beams on the substrate surface; and irradiating the substrate surface with fast atomic beams at an angle of incidence determinable by an inclined angle measured with respect to a rotation axis normal to the substrate surface while a beam source relatively swirls about the rotation axis.

Another aspect of the invention is a method for making micro-protrusions or micro-cavities on a surface of a substrate comprising the steps of a first irradiation step irradiating the substrate surface with fast atomic beams through a mask member consisting of parallel wire or rod members disposed in contact with or in proximity to the substrate surface; and a second irradiation step irradiating the substrate surface with fast atomic beams through a mask member consisting of parallel wire or rod members disposed in contact with or in proximity to the substrate surface, the parallel wire or rod members being oriented at right angles or at an oblique angle to those in the first irradiation step.

Another aspect of the invention is a slider member formed with a plurality of micro-protrusions or micro-cavities on at least one surface thereof, wherein the micro-protrusions or micro-cavities comprise top or bottom surfaces and side surfaces, and an inclusive angle of side surfaces of the micro-protrusions or micro-cavities is selected within a range of angles between 80 to 110 degrees measured with respect to the relative sliding direction of the slider member which is usually a direction parallel to the slider surface.

According to this aspect of the present invention, because the inclusive angle of contact of the side surfaces (upright surfaces) is selected within a range of angles between 80 to 110 degrees, foreign particles do not become entrapped between the micro-protrusion and the sliding surface, but are simply transported by being abutting against the micro-protrusions. In effect, the depression spaces formed by the protrusions act as pockets for the debris particles. Because of the appropriate choice of the inclusive angle, the size of the meniscus is reduced compared with the meniscus size formed in association with conventional micro-protrusions, and sticking is prevented without changing the usual operating parameters such as protrusion height, volume or lubricant thickness or temperature of operation. In other words, another parameter for preventing sticking has been found to assure more reliable operation. Therefore, by forming the inclusive angle of contact to be between 80 to 110 degrees, a thicker layer of lubricant can be used to reduce wear while prevent sticking. Conversely, the control of the meniscus size, by controlling the inclusive angle of contact, enables the force of separation due to the presence of air pressure between the sliding surfaces and the force of attraction working at the meniscus to be optimally balanced, thereby leading to a possibility of effective adjustment of separation distance of the order of nanometers.

The friction reduction effect of the protrusion is especially high when the inclusive angle is larger than 90 degree, i.e. when $90<\theta \leq 110$, because when a wear particle hits the protrusion, it goes down along the upright surface (side surface) so as to not cause generation of large friction. The advantage is particularly prominent when the depression is formed as a lattice configuration. Otherwise, a large friction is generated to cause damage to the slider member, fluctuation of the attitude of the slider member, distortion of the support mechanism for the slider member, or deterioration of the sliding surface, which may, at the worst, make the slider unusable.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIGS. 4A–4D are cross sectional views of the steps in a first embodiment of the method for making the micro-protrusions.

FIG. 7 is a perspective view of a masking comprising a rod assembly.

FIG. 10 is a perspective view of another matrix-type asking made by the process.

FIG. 11 is a perspective view of another matrix-type masking made by the process.

FIG. 12 is a perspective view of another matrix-type masking made by the process.

FIGS. 14A–14F are cross sectional views of the steps to produce the masking shown in FIG. 10.

FIG. 20 is a cross sectional view of micro-protrusions produced by a conventional method.

DESCRIPTION OF THE PREFERRED EMBODIMENTS

The present invention will be explained in the following with reference to drawings and examples.

Figure 1:
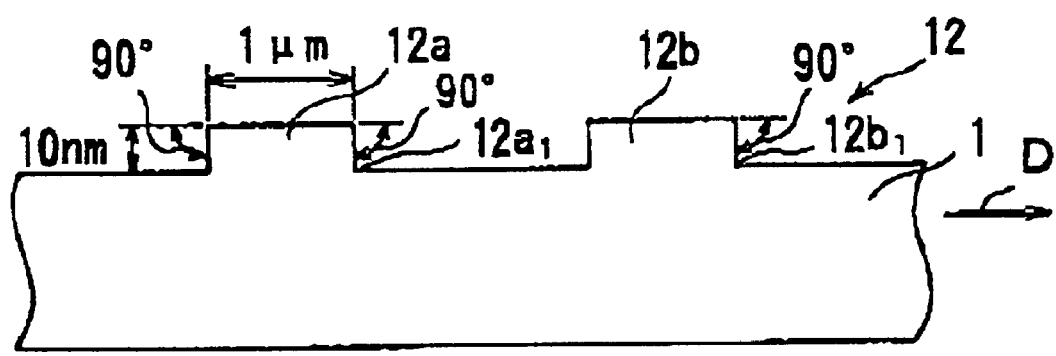
FIG. 1 is a cross sectional view of the micro-protrusions in an embodiment of the present invention.

FIG. 1 is a cross sectional view of a slider member according to the first embodiment of the invention having micro-protrusions thereon. In FIG. 1, substrate 1 is the same type of magnetic disc as shown in FIG. 20 having micro-protrusions 12$a$, 12$b$ (shortened to protrusions hereinbelow) formed on a surface 12 of the substrate 1. As described earlier, the disc is ultimately completed by depositing a magnetic film layer and a protective film layer on the substrate 1 along the contours of the protrusions 12$a$, 12$b$ so that the protective film layer will constitute the ultimate sliding surface. The size of the protrusions 12$a$, 12$b$ is, for example, 10 nm height by 1 mm width. Each of the protrusions 12$a$, 12$b$ comprises a leading surface 12$a_1$, 12$b_1$ oriented toward the direction of relative motion D and intersecting by 90 degrees with the sliding surfaces (the sliding surfaces may be considered to be basically the top surfaces of the protrusions 12$a$, 12$b$).

Figure 2:
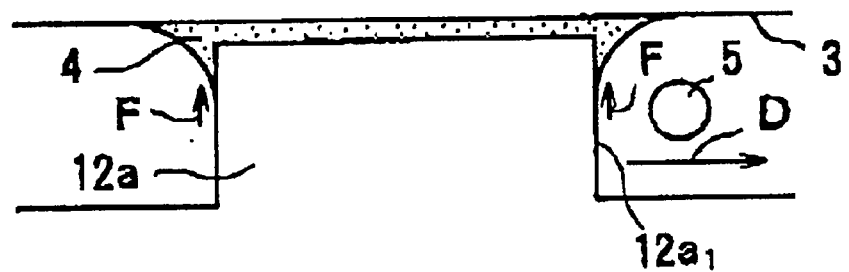
FIG. 2 is a cross sectional view of the micro-protrusions shown in FIG. 1 in contact with a sliding surface.
Figure 24:
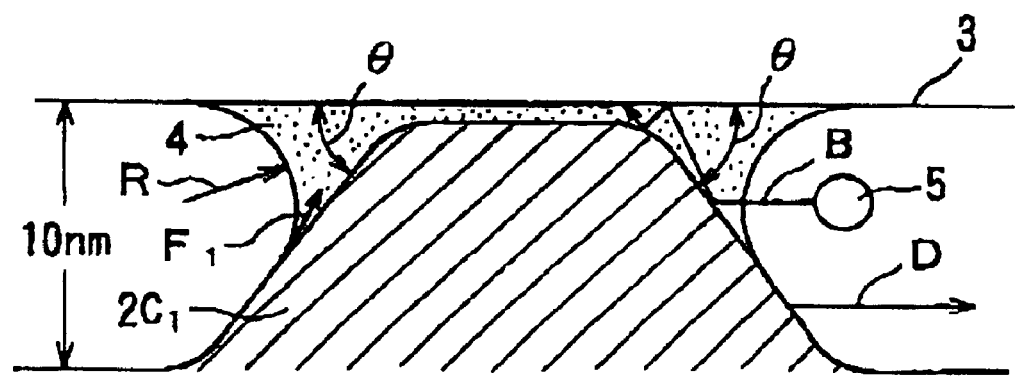
FIG. 24 is a schematic illustration of the formation of a meniscus, an inclusive angle of contact and a typical foreign debris particle.

FIG. 2 is a cross sectional view to illustrate the relationship between the protrusion 12$a$ and a sliding surface 3 of the slider, a liquid substance 4, a foreign particle 5 and the direction of motion D. The notations are the same as those shown in FIG. 24. As can be seen in this drawing, because the inclusive angle of contact of the upright surface 12$a_1$, of the protrusion 12$a$ is 90 degrees with respect to the sliding surface 3, the meniscus formation is less and sticking is less prevalent than those for the protrusions made by the conventional process. Likewise, the foreign particle 5 is less likely to be included between the sliding surface 3 and the protrusion 12.

Figure 3A:
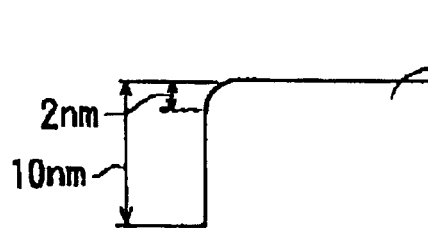
FIGS. 3A–3C are cross sectional views of various structures of the upright walls which may be produced.
Figure 3B:
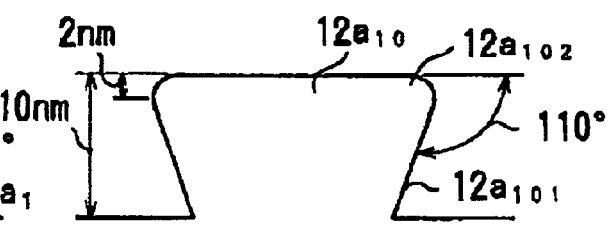
Figure 3C:
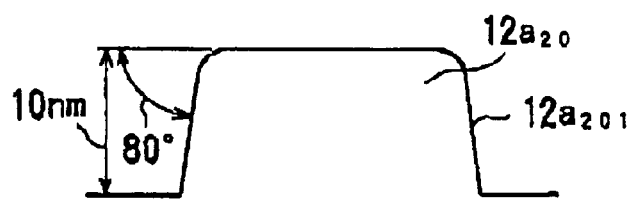

In the above embodiment, the inclusive angle of contact between the upright surfaces 12$a_1$, 12$b_1$ of the protrusions 12$a$, 12$b$ with respect to the sliding surface 3 in the direction of motion D was chosen to be 90 degrees; however, it is not necessary to restrict this angle to 90 degrees. The contact angle may be chosen in a range of 80–110 degrees. This is illustrated by the cross sectional views of the protrusion shown in FIGS. 3A–3C. FIG. 3A shows an inclusive angle of contact of the upright surface at 90 degrees, FIG. 3B shows the angle of the upright surface $12a_{101}$ of the protrusion $12a_{10}$ at 110 degrees, and FIG. 3C shows the angle for the upright surface $12a_{201}$ of the protrusion $12a_{20}$ at 80 degrees to the sliding surface. In all cases, the height of the protrusion is 10 nm. As shown in these drawings, the actual protrusions have their corners radiused at about 2 nm, but in practice, such rounding off of the corners of the protrusions against the sliding surface is unavoidable, and such radiusing has no bearing on the performance of the sliding surface structures, such as the formation of menisci and debris biting. It is also clear that the configuration of the root of the protrusion has no bearing on the biting of foreign particles and meniscus formation. The performance is determined by the inclusive angle of contact of the upright surface of the protrusion extending from the radiused corner.

At the present time, the most sensitive micro-profiling device is an Atomic Force Microscope having a fine-needle sensor which explores between two objects to measure the interatomic forces acting between two objects. However, it is difficult to determine the profile shape even with this instrument. In practice, as will be described in the embodiments to follow, the profile shape can be estimated from the angle of irradiation of the fast neutron particles which are used to produce the protrusions.

At this point, the reasons for limiting the angle of the upright surface to between 80–110 degrees will be explained. FIG. 3B shows the radiused section $12a_{102}$ having an inclusive angle of contact of 110 degrees, and if the angle of the upright surface $12a_{101}$ exceeds this value, the radiused section $12a_{102}$ quickly becomes brittle and vulnerable to chipping. Therefore, about 110 degrees is suitable as the upper limit of the angle of the upright surface. The lower limit has been determined by experimentation so that if the angle is less than 80 degrees, the occurrence of sticking and debris biting becomes excessive so that 80 degrees has been chosen as the lower limit.

The process of forming the protrusions will be explained in the following. FIGS. 4A–4D are cross sectional views showing the steps in a first embodiment of making the protrusions. In FIG. 4A, the substrate 1 is a glass substrate. As shown in FIG. 4A, the top surface 10 of the substrate 1 is polished flat. Next, as shown in FIG. 4B, fine powdery particles 13 (for example, resin particles which would not be etched by fast neutron particles) of 1 mm diameter as a mask or masking are dispersed on the top surface 10 which is irradiated with a fast neutron beam comprised of $SF_6$ for one minute. The fast neutron beam is referred to as a Fast Atomic Beam (FAB) and is characterized by its high speed, electrical neutrality and linearity of beam propagation. Because the beam comprises neutron particles, not ionic particles, the FAB is able to etch electrically insulating substances. The FAB has an excellent linear propagation property, and irradiation through a masking at right angles to a target surface will produce upright structures at 90 degrees.

The powder particles 13 are dispersed so that the FAB will etch 95% of the planar area of the top surface 10, to produce the protrusions 12a, 12b which have the same profile as those shown in FIG. 1. Next, the powder particles 13 are washed away, and a magnetic film layer 15 and a carbon film layer 16, functioning as a protective film having lubricating as well as anti-oxidation qualities, are deposited on the surfaces to follow the contours of the protrusions 12a, 12b. These steps complete the process of making a magnetic disc. The upright surfaces of the protrusions 12a, 12b are at 90 degrees to the direction D of the sliding motion of substrate 1, and the carbon film layer 16 follows the contours of the protrusion at the same angle. The upright surfaces of the protrusions produced by the techniques presented in the second to fourth embodiments are formed in the same manner. The formation of a 90-degree angle on the upright surfaces has been made possible for the first time, only through the use of the fast neutron beam, and it should be noted that conventional techniques are not capable of producing such angels. Although the embodiment was illustrated with the use of powder particles 13 as a masking material, other materials such as fine pieces of needle fibers or plates, ionic crystals such as salt can also be used.

Figure 5A:
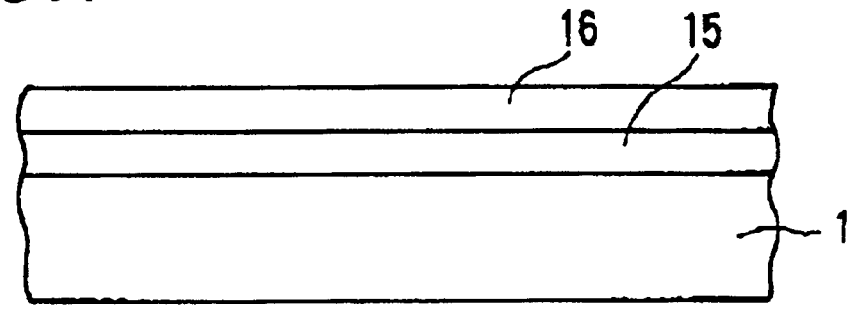
FIGS. 5A–5C are cross sectional views of the steps in a second embodiment of the method for making the micro-protrusions.
Figure 5B:
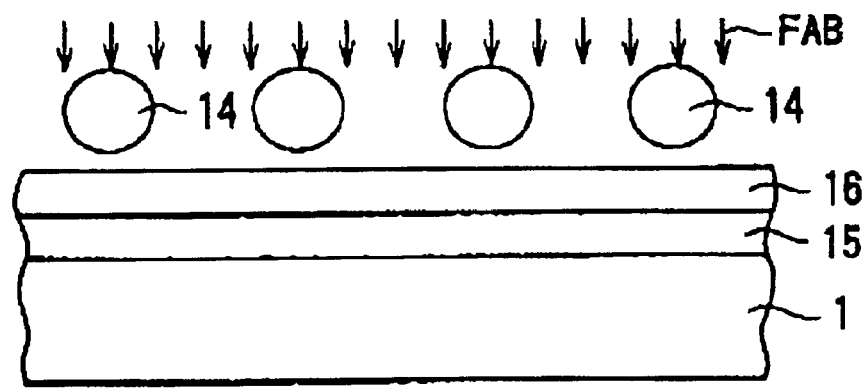
Figure 5C:
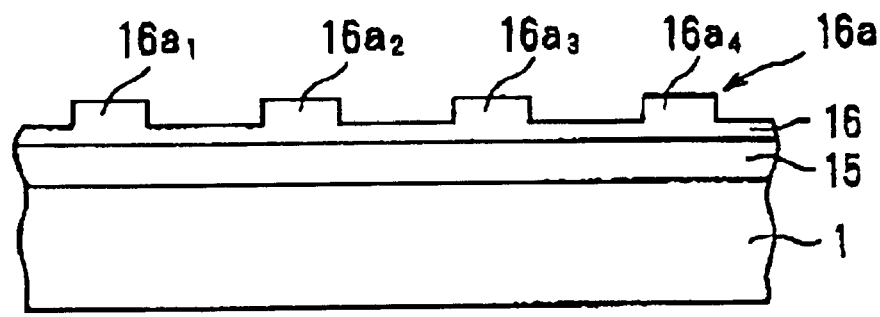

FIGS. 5A–5C are cross sectional views to illustrate a process of producing protrusions in a second embodiment. Those parts which are the same or equivalent to those shown in FIGS. 4A–4D are given the same reference numerals, and their explanations are omitted. As shown in FIG. 5A, a magnetic film 15 and a protective film layer 16 (carbon, in this case) are deposited on top of the substrate 1. Next, a masking device comprised by wires 14 such as fine piano wires arranged in a plane, is positioned near the carbon film layer 16, and an oxygen FAB is radiated from above. The resulting structure, shown in FIG. 5C, comprises protrusions $16a_1$–$16a_4$ directly on top of the carbon film layer 16. In this example, wires 14 are separated from the carbon film layer 16, but it is permissible to have the wires 14 contact the carbon film layer 16. Also, it is not necessary to have wires 14 of circular cross sectional shape, and other shapes such as square, oval, trapezoidal and other shapes are permissible.

Figure 6A:
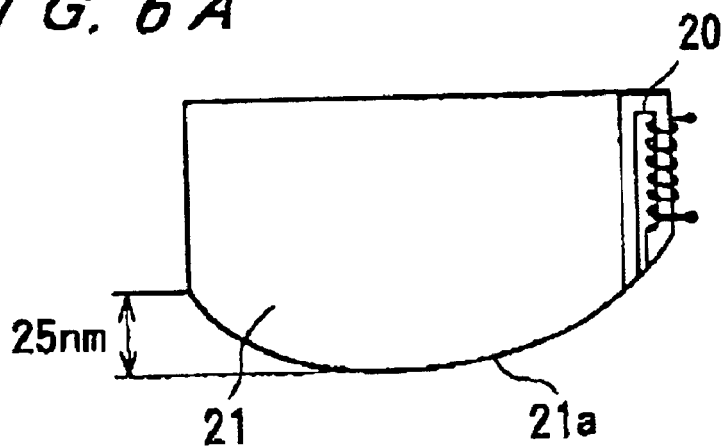
FIGS. 6A–6C are cross sectional views of the steps in a third embodiment of the method for making the micro-protrusions.
Figure 6B:
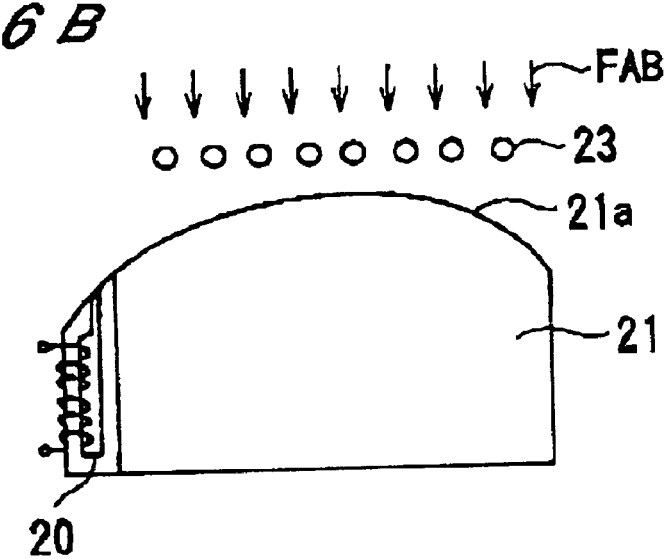
Figure 6C:
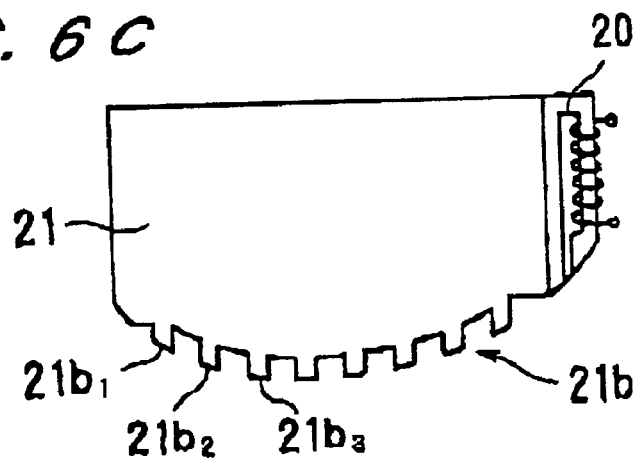

FIGS. 6A–6C are cross sectional views showing a process of making protrusions in a third embodiment. In FIG. 6A, a magnetic head 20 (made of a ceramic material) has a slider 21 having a smooth curved sliding surface 21a for sliding on a magnetic disc (not shown). The curved surface is known as a crown, and has a height of 25 nm, for example. The examples shown in FIGS. 4A–4D and 5A–5C referred to making protrusions on magnetic discs, but in this embodiment, the protrusions are provided on the slider. First, as shown in FIG. 6B, the magnetic head 20 and the slider 21 are inverted, and a masking, comprising parallel wires 23, is disposed to face the curved surface 21a, and the FAB is irradiated from above. The resulting structure of the curved surface 20a of a slider 21b comprising protrusions $21b_1, 21b_2, 21b_3 \ldots$ is shown in FIG. 6C. It should be noted that, as in the second embodiment, the wires 23 may be placed in contact with the curved surface 21a, and, there is no need to restrict the cross sectional shape of the wires 23 to a circular shape, and other shapes such as square, oval and trapezoidal are permissible.

In the second and third embodiments, parallel wires 14, 23 were used for the masking device, but rod members may replace wire members. An example is shown in FIG. 7 which is a perspective view of an assembly of rod members. Here, the masking device is comprised by a rod assembly 14A (23A) comprised by rod members $14A_2$ arranged in parallel on a base section $14A_1$. These rod members $14A_2$ may be replaced with wire members, as in the second and third embodiments, without affecting the result. The cross sectional shape of the rod members $14A_2$ shown in FIG. 7 is square, but other shapes such as circular, oval and trapezoidal are also permissible. The wire assembly 14A (23A) shown in this drawing can be made by a process which will be presented later in FIG. 13 or 14.

Figure 8A:
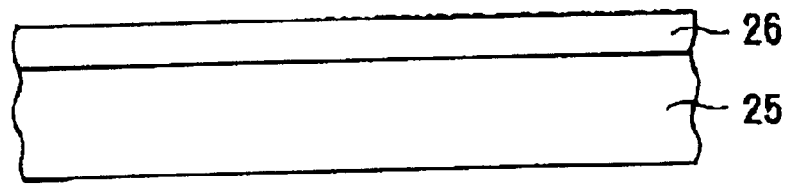
FIGS. 8A, 8C are cross sectional views of the steps for making the micro-protrusions in a fourth embodiment of the method, and Figure BB is a perspective view of a net-type masking device
Figure 8B:
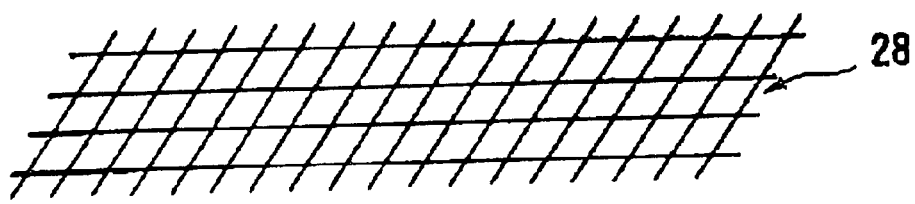
FIG. 8D is a perspective view of a matrix-type product made by the process.
Figure 8C:
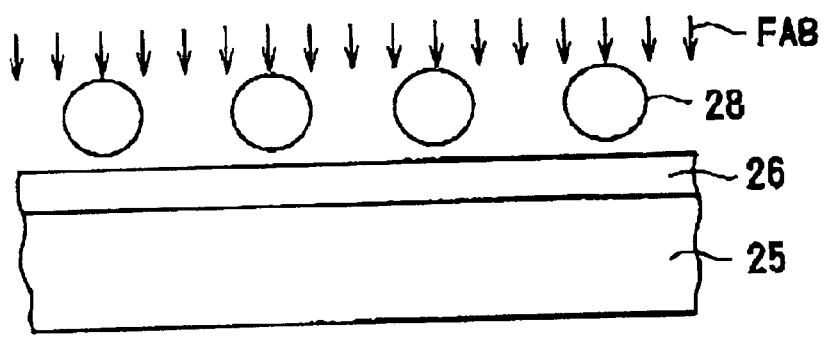
Figure 8D:
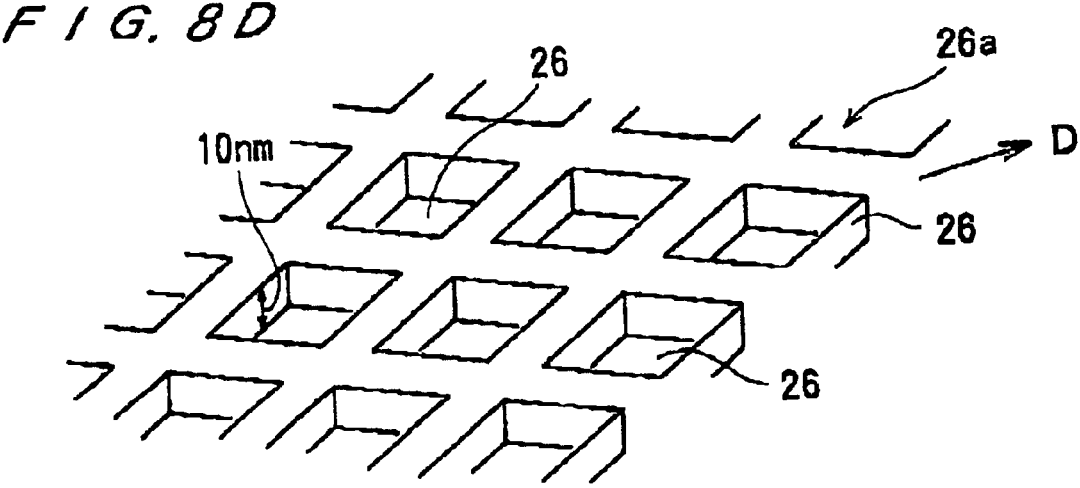

FIGS. 8A–8C show process steps related to making protrusions in a fourth embodiment, and FIG. 8D is a perspective view of the product produced by the process. In this embodiment, protrusions are produced on top of the carbon film layer 26 serving as the protective layer for contacting the slider of the magnetic head. In contrast to the previous protrusions which were isolated entities, the protrusions produced in this example are formed in a contiguous way. As shown in FIG. 8A, the magnetic head is comprised by carbon film layer 26 and an underlying whole slider structure referred by numeral 25. FIG. 8B is a perspective view of a wire matrix 28 used as a masking for the FAB irradiation process. The matrix masking 28 is placed in the vicinity of the carbon film layer 26, and an oxygen FAB is radiated for fifteen seconds through the matrix masking 28. The resulting product is shown in FIG. 8D comprising a contiguous carbon protrusion 26a formed from carbon film layer 26. The matrix masking 28 is disposed in such a way that the direction D of the relative sliding motion is aligned with the diagonals of square-shaped depressions formed in layer 26. It should be noted again that there is no restriction in the cross sectional shape of the wires 28, and other shapes such as squares, oval, trapezoidal and other shapes may be substituted. The matrix masking 28 also need not necessarily be made into a net shape beforehand. It is permissible to utilize a set of parallel wires and another set of parallel wires disposed at right angles to the first set to form a net shape.

Figure 9:
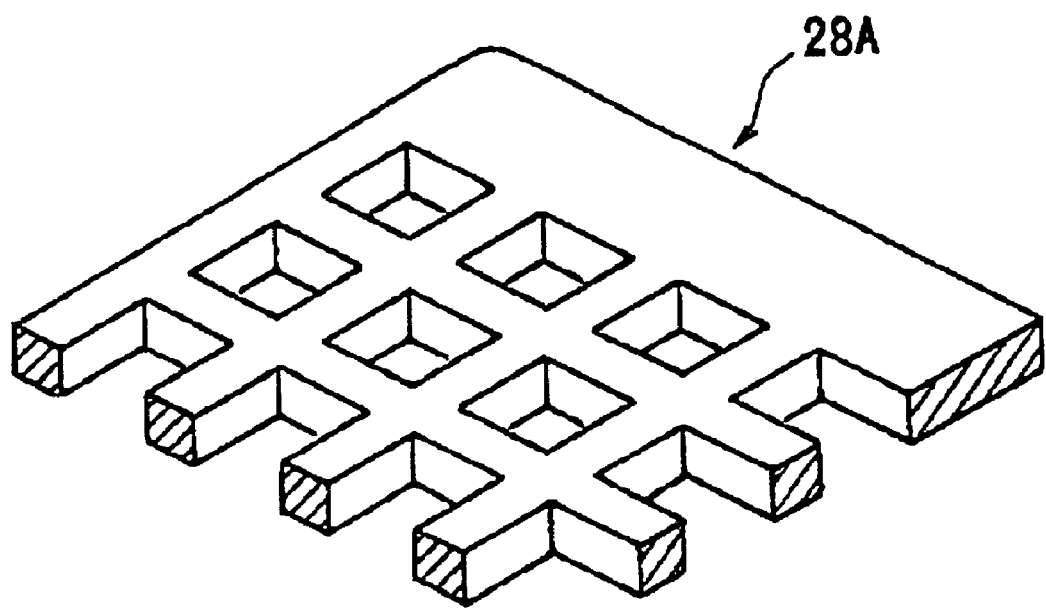
FIG. 9 is a perspective view of another matrix-type asking made by the process.

The example illustrated in FIG. 8D utilized a net type masking 28, but a matrix type masking may be made by using materials other than wires. FIGS. 9–12 show examples of other types of contiguous masking, referred to generally as matrix-type masking hereinbelow, which includes plate-type masking having fine holes which are equivalent in their performance for making protrusions. FIG. 9 shows a matrix type masking 28A having a plurality of square-shaped cavities formed in a plate, FIG. 10 shows a masking 28B having a plurality of hexagonal-shaped cavities, or honeycomb shaped cavities, formed in a plate, FIG. 11 shows a masking 28C having a plurality of circular-shaped cavities formed in a plate, and FIG. 12 shows a masking 28D having a plurality of rhombus-shaped cavities formed in a plate. Other shapes of cavities may also be adopted.

Figure 13A:
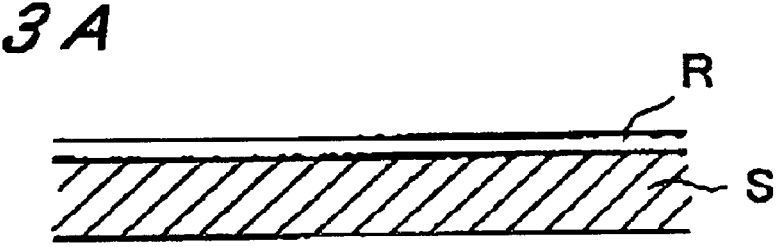
FIGS. 13A–13C are cross sectional views of the steps to produce the masking shown in FIG. 9.
Figure 13B:
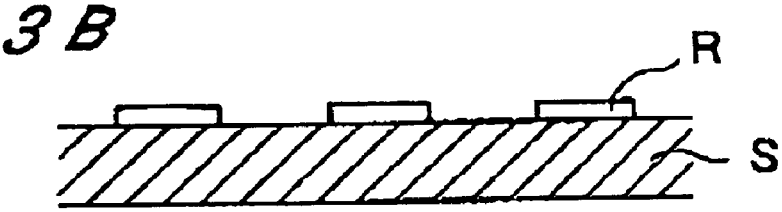
Figure 13C:
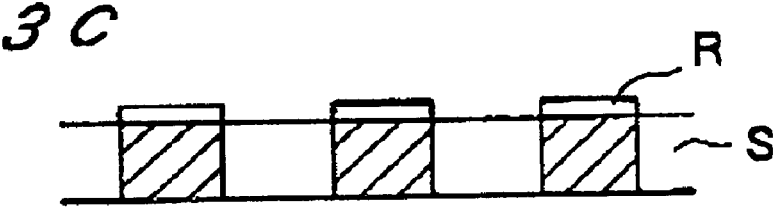

A method for making the matrix type masking shown in FIGS. 9-12 will be briefly explained with reference to FIGS. 13A–13C and 14A–14F. FIGS. 13A–13C, for example, relate to the steps for making the masking 28A shown in FIG. 9. A base plate S is covered with a photoresist film R (FIG. 13A); next, square shaped portions are removed for the photoresist film R by means of a photolithographic process (FIG. 13B); cavities are formed in the base plate S corresponding to the locations of the removed sections of film R (FIG. 13C) by an etching process to produce the matrix type masking 28A shown in FIG. 9.

FIGS. 14A–14F, for example, relate to the steps for making the masking 28B shown in FIG. 10. The masking process utilizes a base plate S, an electrically conductive layer E and a photoresist layer R The conductive layer E is formed on the base plate S (FIG. 14A), and the layer E is covered with the photoresist film R (FIG. 14B). Next, hexagonal shaped portions are removed from the photoresist film R by means of a photolithography process (FIG. 14C); cavities are formed in the conductive layer E corresponding to locations of removed sections of film R by an etching process, and the remaining resist film R is removed (FIG. 14D). Using the remaining conductive layer E, a thick electroplated layer M is produced on the layer E (FIG. 14E). Next, the conductive layer E is removed by immersing the entire masking-precursor in an etching solution which does not attack the base plate S and the plated layer M, the latter being separated form the base plate S to produce matrix type masking 28B shown in FIG. 10. It is clear that the rod assembly 14A (23A) shown in FIG. 7 can also be produced by the steps outlined in FIGS. 13A–13C or 14A–14F.

Figure 15A:
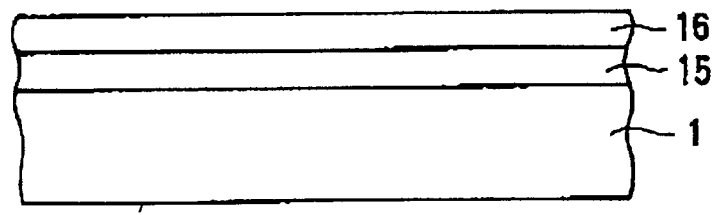
FIGS. 15A–15C are cross sectional views of the steps in a fifth embodiment of the method for making the micro-protrusions.
Figure 15B:
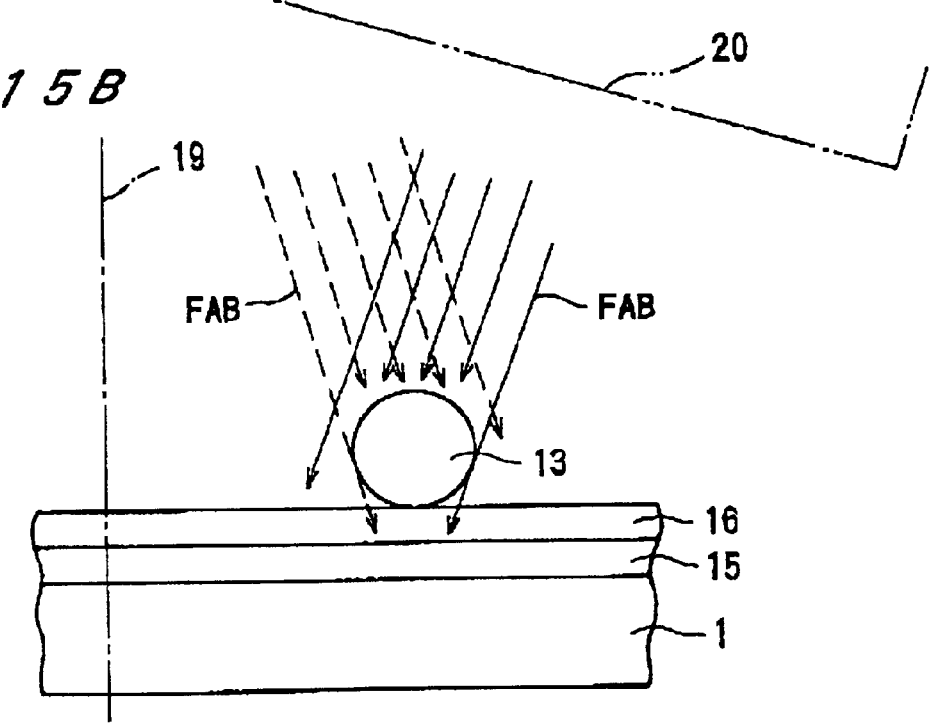
Figure 15C:
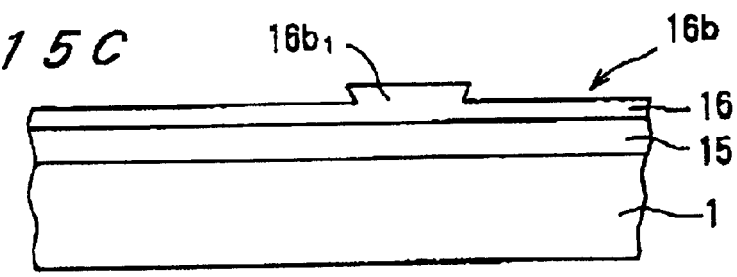

FIGS. 15A–15C are cross sectional views of the steps in making protrusions in the fifth embodiment. In contrast to each of the foregoing embodiments related to making protrusions having upright surface angles of 90 degrees, the fifth embodiment relates to making protrusions having upright surface angles exceeding 90 degrees, whose profile is the same as that shown in FIG. 3B. FIG. 15A shows substrate 1 for the magnetic disc including a magnetic film layer 15 and a carbon film layer 16. Powder particles 13 (for masking) such as those shown in FIG. 15B are dispersed on the surface of the magnetic disc, and the surface is irradiated with the FAB from above. A beam source 20 for the FAB is inclined at a specific angle with respect to an axis 19 which is at right angles to the surface of the magnetic disc. The FAB is emitted from the beam source 20 to the carbon film layer 16 while the source 20 is made to relatively swivel about the axis 19. In FIG. 15B, the incident beams emitted when the beam source 20 is located at the double-dotted broken line are shown by solid lines while the incident beams emitted when the beam source 20 is located at the opposite location are shown by ordinary broken lines. By utilizing this method, protrusions 16b, having upright surface angles in excess of 90 degrees are formed on the sliding surface.

Figure 16A:
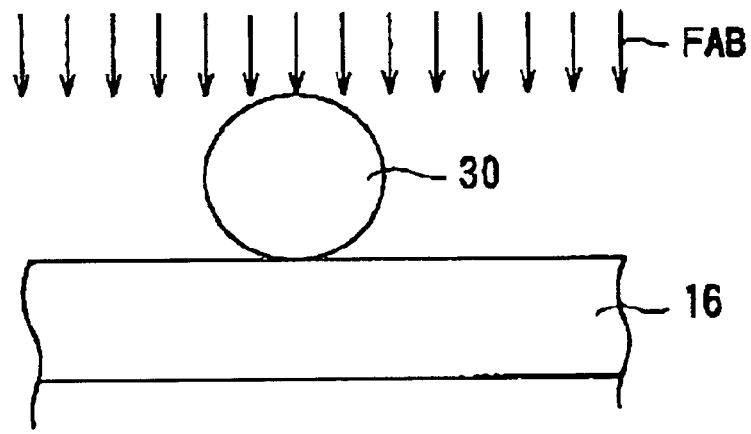
FIGS. 16A–16D are cross sectional views of the steps in a sixth embodiment of the method for making the micro-protrusions.
Figure 16B:
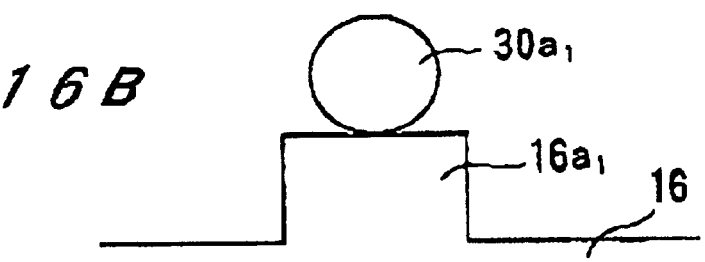
Figure 16C:
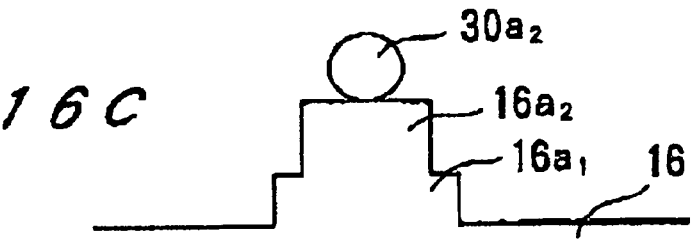
Figure 16D:
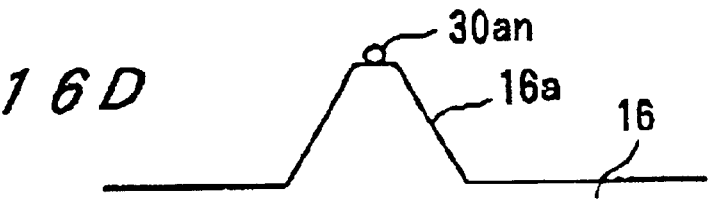

FIGS. 16A–16D are cross sectional views, in a sixth embodiment, of the steps for making protrusions on a magnetic disc having a carbon film layer 16 with the use of powder particles 30 made of carbon, for example. As shown in FIG. 16A, the carbon particles 30 are dispersed on the carbon film layer 16, and the FAB is radiated form above. After a certain period of irradiation, protrusions $16a_1$, shown in FIG. 16B are formed on the carbon film layer 16, however, because the FAB is also directed at the powder particles 30, their diameters are reduced during the irradiation process. An example of the reduced-diameter powder particle $30a_1$, is shown in FIG. 16B. When the irradiation process is continued in this state, because the masking particle now has a reduced diameter, a protrusion $16a_2$ having a smaller diameter than the original powder particle 30 is formed on top of the prior protrusion $16a_1$, as illustrated in FIG. 16C. The powder particle becomes further reduced to produce a powder particle $30a_2$, as shown in FIG. 16C. If the irradiation time and/or the irradiation strength are adjusted so as to produce powder particles of gradually reducing diameters, the protrusion assumes substantially a cone shape as illustrated in FIG. 16D, and the original powder particle 30 becomes a micro-particle $30a_n$, and ultimately disappears as the irradiation process is continued. The process finally produces protrusions having an upright surfaces oriented at angles less than 90 degrees with respect to the sliding surface. An advantage of this process is that the cumbersome step of washing off the powder particles necessary in the example shown in FIGS. 4A-4D can be eliminated. It can be readily understood that the use of the above process simultaneously with the method of slanted irradiation FAB shown in FIGS. 15A–15C will enable production of an inclusive angle of the upright surface at 90 degrees with respect to the sliding surface.

The foregoing embodiments are related to methods of forming protrusions on a magnetic disc or slider surface. It should be noted that the formation of such protrusions is not limited to magnetic discs or sliders, and they can be produced equally well on other devices such as optical magnetic discs and their associated parts. An example of application to a radial slide bearing is illustrated in FIGS. 17A–17D, and an example of an application to a thrust bearing is shown in FIG. 18.

Figure 17A:
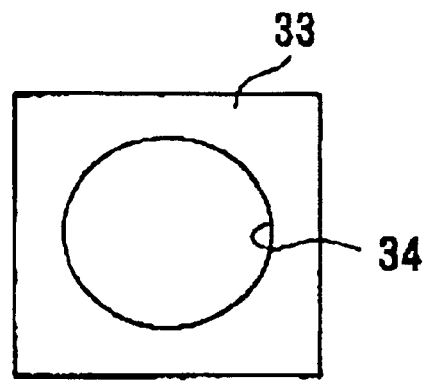
FIGS. 17A–17D are cross sectional views of the steps in a seventh embodiment of the method for making the micro-protrusions.
Figure 17B:
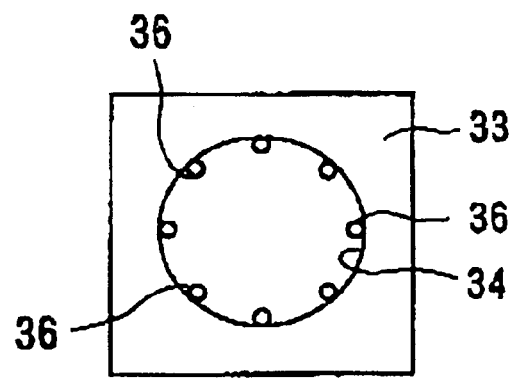
Figure 17C:
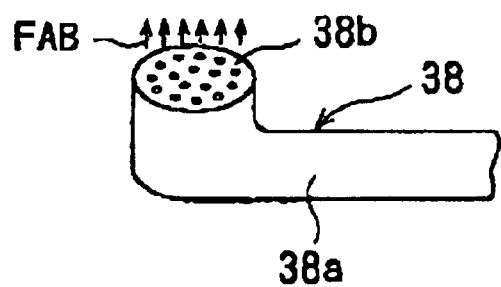
Figure 17D:
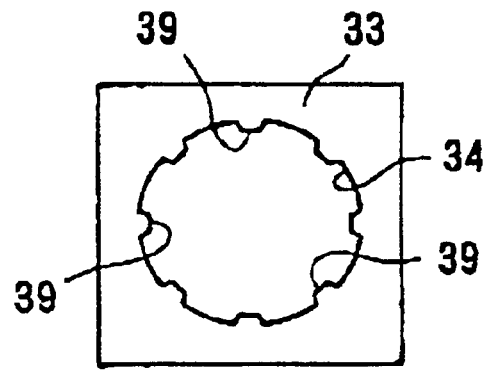

FIGS. 17A–17D are cross sectional views of the steps of making protrusions in a seventh embodiment. A radial slide bearing housing comprises a steel block 33 having an axial hole 34 through the middle thereof for insertion of a rotation shaft (not shown). As shown in FIG. 17A, the block 33 constitutes a housing for the bearing, and the inside surface of the axial hole serves as the bearing surface. Next, as shown in FIG. 17B, parallel wires 36 are arranged to face the inner surface of the block 33, and a beam source 38 shown in FIG. 17C is inserted into the axial hole 34 so as to irradiate the inner surface of the axial hole 34 with the FAB. This FAB irradiation process is carried out while rotating the beam source 38 about its axis 38a as well as translating the beam source 38 in the axial direction. This process results in the production of protrusions 39, on the inner surface of the axial hole 34, having upright surfaces at 90 degrees to the sliding surface, as shown in FIG. 17D.

Figure 18:
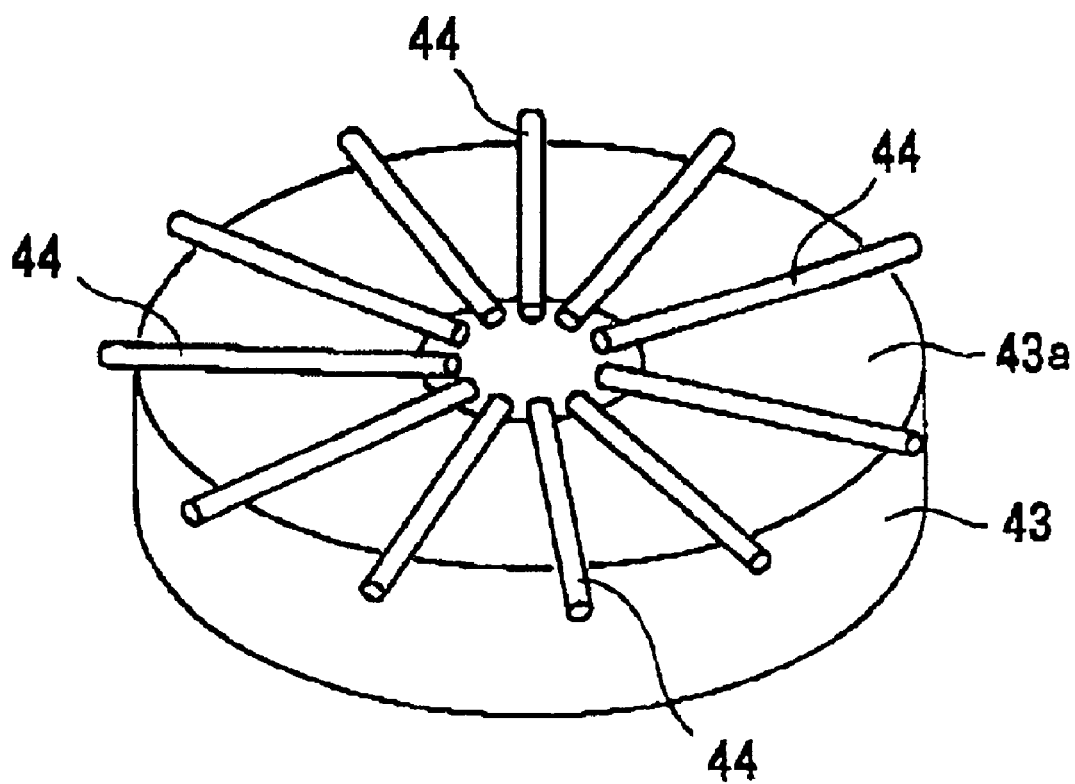
FIG. 18 is a perspective view of a step in an eighth embodiment of the method for making the micro-protrusions.

FIG. 18 is a perspective view of a step in making the protrusions in an eight embodiment. A plurality of wires 44 are arranged radially on a thrust bearing housing 43, made of steel, having a sliding surface 43a, and the FAB is irradiated from above. This process results in the production of protrusions on the sliding surface 43a, but the process of formation is similar to the cases presented earlier and will not be illustrated.

Figure 19:
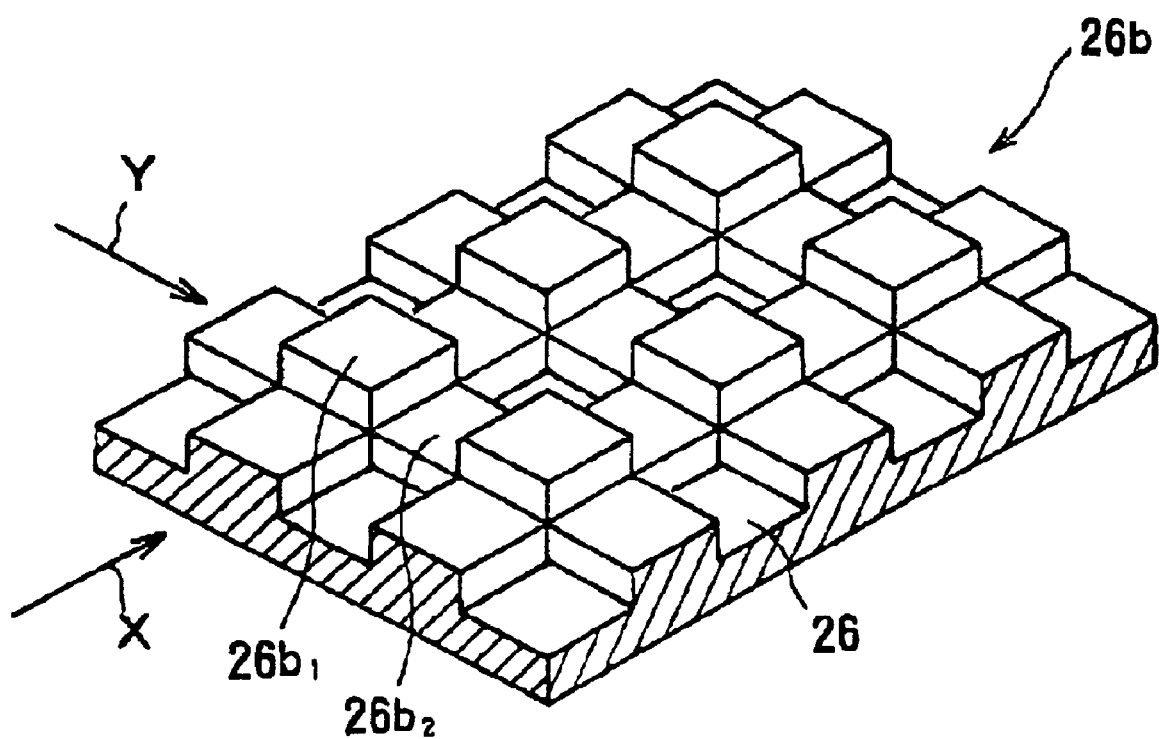
FIG. 19 is a perspective view of the product made in an eighth embodiment of the method for making the micro-protrusions.
Figure 21:
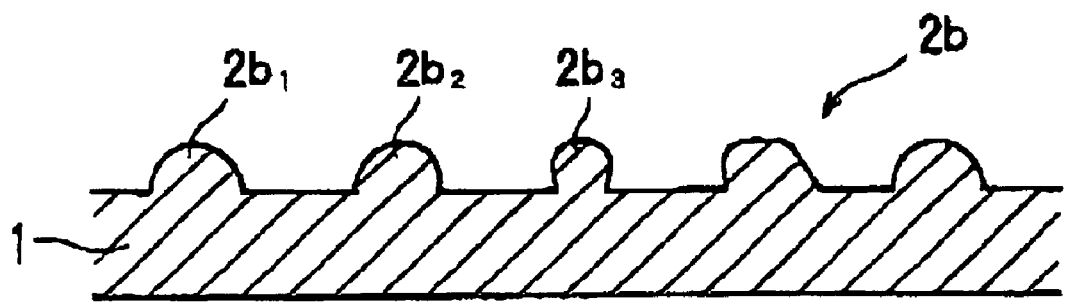
FIG. 21 is a cross sectional view of micro-protrusions produced by a conventional method.
Figure 22:
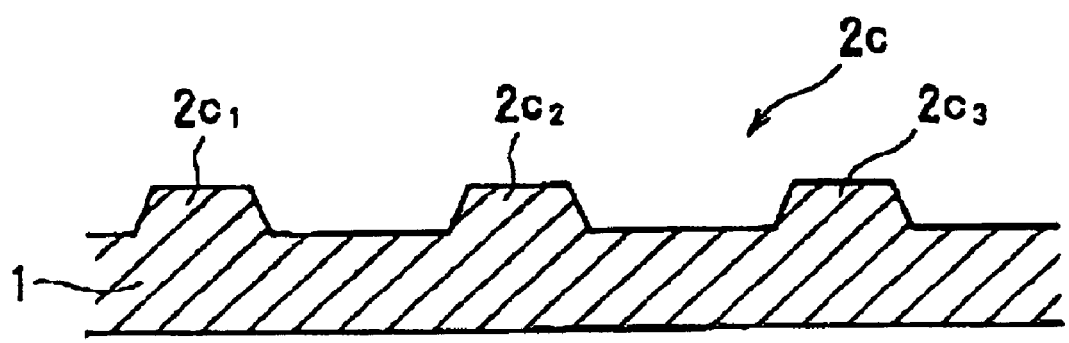
FIG. 22 is a cross sectional view of micro-protrusions produced by a conventional method.
Figure 23A:
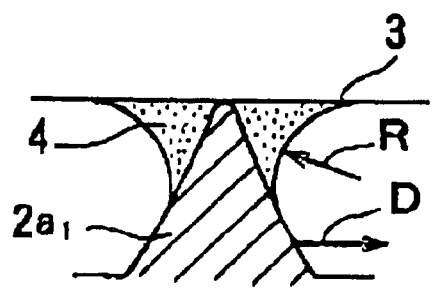
FIGS. 23A–23C are a cross sectional views of typical profiles of the micro-protrusions shown in FIGS. 20–22, respectively.
Figure 23B:
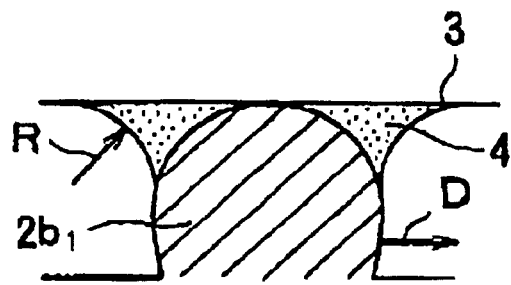
Figure 23C:
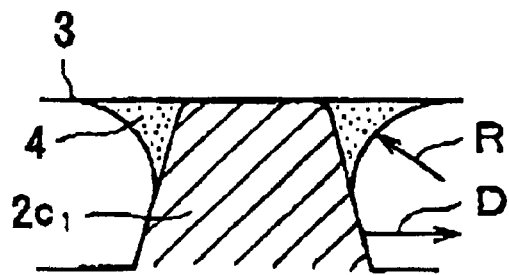

FIG. 19 is a perspective view or a step in making the protrusions in another embodiment. All of the foregoing embodiments are related to making single-stage protrusions, including the one shown in FIG. 16D. This may appear to be a multi-stage protrusion on a microscopic scale, but this is effectively a single-stage protrusion. It should be noted that the multi-stage protrusions are equally effective as single-stage protrusions.

FIG. 19 shows a case of forming two-stage protrusions on a carbon film layer 26. In FIG. 19, protrusions 26b are comprised of a plurality of top-stage protrusions $26b_1$, and lower-stage protrusions $26b_2$. The protrusion 26a which was shown in FIG. 8D was made by using a matrix type masking comprising a wire-net 28. The protrusions 26b shown in FIG. 19 are made by arranging wires of the net aligned in one direction as a first masking. And after irradiating with the FAB, the wires are then arranged in the orthogonal direction to be used as a second masking, to finally produce two-stage protrusions. The protrusions 26b shown in FIG. 19 were made by this two-step process. That is, wires aligned in the Y-direction were used first to irradiate with the FAB, and after removing these U-wires, another set of wires aligned in the X-direction were used for further irradiation.

Such two-stage protrusions 26b not in contact with each other through the sliding surface can be produced by using the above method, without relying on the powder process illustrated in FIGS. 4A–4D, thereby simplifying the process. The two-stage protrusions can also be made by using a masking device based on the rod assembly 14A shown in FIG. 7. When this masking is used once, arrays of linear contiguous protrusions are formed, and then by rotating the masking and irradiating again, it is possible to produce independent two-stage protrusions shown in FIG. 19.

In overall summary, the micro-protrusions presented in the present invention are unique because of the inclusive angle of contact of the upright surface is limited to be in a range between 80–110 degrees, depending on the application requirements. This range of angles is effective in preventing biting of foreign debris in the inclusion space and sticking of the sliding surfaces. The use of the fast atomic beam has been the key factor which enabled for the first time selection of the contact angle of the upright surfaces.

What is claimed is:

1. A method of during the manufacture of a slider member to be used in sliding relation to an other member, forming micro-protrusions on or micro-cavities in a surface of a substrate from which is formed the slider member, in a manner to reduce sticking between the surface and the other member and to reduce entrapment of foreign particles therebetween, said method comprising:

placing the substrate in a process chamber;

supporting a mask member in front of the surface of the substrate, the mask member disposed in contact with or in proximity of the substrate surface, and the mask member having a plurality of cavities arranged as a matrix-type on a plate;

irradiating fast atomic beams through the mask member onto the surface of the substrate, and forming the micro-protrusions or the micro-cavities, said forming comprising controlling said irradiating such that each micro-protrusion or micro-cavity has a top or bottom surface, respectively, and a side surface, with the side surface extending at an inclusive angle of from larger than 90° to approximately 110° to an intended direction of sliding of the slider member relative to the other member and to the surface of the substrate, wherein the micro-protrusions or micro-cavities have a height or depth ranging from 10 to 50 nm and 10 to 1,000,000 micro-protrusions or micro-cavities are formed on a 1 $mm^2$ surface of the substrate; and forming a magnetic film layer and a protective film layer on the micro-protrusions or the micro-cavities.

2. A method as claimed in claim 1, wherein the mask member has a plurality of openings arranged in a matrix-type array formed on a plate.

3. A method as claimed in claim 2, wherein the opening is circular-shaped, oval-shaped, square-shaped or honeycomb-shaped.

4. A method as claimed in claim 2, wherein the opening is rhombus-shaped or hexagonal-shaped.

5. A method as claimed in claim 1, wherein the slider member comprises a magnetic disc or a magnetic head.

6. A method as claimed in claim 1, wherein the surface of the substrate comprises glass.

7. A method as claimed in claim 1, wherein said irradiating comprises directing, the fast atomic beams from a beam source at an angle of incidence determined by an angle of inclination measured with respect to a rotation axis normal to the surface of the substrate, and rotating one of the beam source and the substrate about the rotation axis relative to the other of the beam source and the substrate.

8. A method as claimed in claim 1, wherein said irradiating comprises a first irradiation operation of irradiating the fast atomic beams through a first mask member comprising parallel wires or rods disposed adjacent to the surface of the substrate, and a second irradiation operation of irradiating the fast atomic beams through a second mask member comprising parallel wires or rods disposed adjacent to the surface of the substrate.

9. A method as claimed in claim 1, wherein the protective layer comprises carbon, $SiO_2$, or ceramic material.

10. A method as claimed in claim 1, wherein the mask member comprises micro-objects dispersed on the surface of the substrate.

11. A method as claimed in claim 10, wherein the micro-objects comprise micro-particles of powder.

12. A method as claimed in claim 10, wherein the micro-objects are formed from at least one material selected from the group consisting of alumina, carbon, $Si_3N_4$, SiC, TiN, $ZrO_2$, MgO and synthetic resin.

13. A method as claimed in claim 11, wherein the micro-objects are susceptible to etching by the fast atomic beams.

14. A method as claimed in claim 11, wherein the micro-objects are not susceptible to etching by the fast atomic beams.

15. A method as claimed in claim 1, wherein the mask member comprises a plurality of fine wire or rod members disposed adjacent the surface of the substrate.

16. A method as claimed in claim 15, wherein the plurality of wire or rod members extend parallelly.

17. A method as claimed in claim 15, wherein the plurality of wire or rod members are arranged to form a matrix.

18. A method as claimed in claim 1, wherein the micro-protrusions or micro-cavities have a height or depth of approximately 10 nm.

19. A method of, during the manufacture of a slider member to be used in sliding relation to an other member, forming micro-protrusions on or micro-cavities in a surface of the slider member in a manner to reduce sticking between the surface and the other member and to reduce entrapment of foreign particles therebetween, said method comprising:

depositing a protective film layer on a substrate;

placing the substrate in a process chamber;

supporting a mask member in front of the surface of the protective film layer, the mask member disposed in contact with or in proximity of the surface, and the mask member having a plurality of cavities arranged as a matrix-type on a plate;

irradiating fast atomic beams through the mask member onto the surface of the protective film layer, and forming the micro-protrusions or the micro-cavities, said forming comprising controlling said irradiating such that each micro-protrusion or micro-cavity has a top or bottom surface, respectively, and a side surface, with the side surface extending at an inclusive angle of from larger than 90° to approximately 110° to an intended direction of sliding of the slider member relative to the other member and to the surface of the substrate, wherein the micro-protrusions or micro-cavities have a height or depth ranging from 10 to 50 nm and 10 to 1,000,000 micro-protrusions or micro-cavities are formed on a 1 mm² surface of the substrate.

20. A method as claimed in claim 19, wherein the protective layer comprises carbon, SiO₂, or ceramic material.

21. A method as claimed in claim 19, wherein a magnetic film layer is formed between the protective film layer and the substrate.

22. A method of, during the manufacture of a slider member to be used in sliding relation to an other member, forming micro-protrusions on or micro-cavities in a surface of a substrate from which is formed the slider member, in a manner to reduce sticking between the surface and the other member and to reduce entrapment of foreign particles therebetween, said method comprising:

placing the substrate in a process chamber, wherein the substrate has a smooth curved sliding surface;

supporting a mask member in front of the surface of the substrate, the mask member disposed in contact with or in proximity of a portion of the substrate surface, and the mask member having a plurality of cavities arranged as a matrix-type on a plate;

irradiating fast atomic beams through the mask member onto the surface of the substrate, and forming the micro-protrusions or the micro-cavities, said forming comprising controlling said irradiating such that each micro-protrusion or micro-cavity has a top or bottom surface, respectively, and a side surface, with the side surface extending at an inclusive angle of from larger than 90° to approximately 110° to an intended direction of sliding of the slider member relative to the other member, wherein the micro-protrusions or micro-cavities have a height or depth ranging from 10 to 50 nm and 10 to 1,000,000 micro-protrusions or micro-cavities are formed on a 1 mm² surface of the substrate.

23. A method as claimed in claim 22, wherein the slider member comprises a magnetic head.

24. A method as claimed in claim 22, further comprising:

forming a protective film layer on the micro-protrusions or the micro-cavities.

25. A method of, during the manufacture of a slider member to be used in sliding relation to an other member, forming micro-protrusions on or micro-cavities in a surface of a substrate from which is formed the slider member, in a manner to reduce sticking between the surface and the other member and to reduce entrapment of foreign particles therebetween, said method comprising:

placing the substrate in a process chamber;

supporting a mask member in front of the surface of the substrate, the mask member disposed in contact with or in proximity of the substrate surface;

irradiating fast atomic beams through the mask member onto the surface of the substrate, and forming said micro-protrusions or said micro-cavities, said forming comprising controlling said irradiating such that each micro-protrusion or micro-cavity has a top or bottom surface, respectively, and a side surface, with the side surface extending at an inclusive angle of from larger than 90° to approximately 110° to an intended direction of sliding of the slider member relative to the other member and to the surface of the substrate, wherein the micro-protrusions or micro-cavities are two-stage protrusions having a plurality of top-stage protrusions and lower-stage protrusions; and forming a magnetic film layer and a protective film layer on the micro-protrusions or the micro-cavities.

* * * * *